United States Patent
Plenderleith et al.

(10) Patent No.: US 11,636,193 B1
(45) Date of Patent: Apr. 25, 2023

(54) INTUITION-BASED CHALLENGES

(71) Applicant: Amazon Technologies, Inc., Seattle, WA (US)

(72) Inventors: Jamie Plenderleith, Dublin (IE); Monika Marta Gnyp, Maynooth (IE)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 16/868,221

(22) Filed: May 6, 2020

(51) Int. Cl.
*H04L 9/32* (2006.01)
*G06F 21/36* (2013.01)
*G06F 21/43* (2013.01)
*G06F 21/78* (2013.01)

(52) U.S. Cl.
CPC .............. *G06F 21/36* (2013.01); *G06F 21/43* (2013.01); *G06F 21/78* (2013.01); *H04L 9/3271* (2013.01); *G06F 2221/2133* (2013.01)

(58) Field of Classification Search
CPC . G06F 21/36; G06F 2221/2133; H04L 9/3271
See application file for complete search history.

(56) References Cited

U.S. PATENT DOCUMENTS

| | | | |
|---|---|---|---|
| 2011/0208716 A1* | 8/2011 | Liu | G06F 16/583 707/E17.108 |
| 2016/0239654 A1* | 8/2016 | Johri | G06F 21/36 |
| 2017/0090569 A1* | 3/2017 | Levesque | G06F 21/36 |
| 2017/0262623 A1* | 9/2017 | Plenderleith | G06F 3/04842 |
| 2020/0076822 A1* | 3/2020 | DeLuca | G06F 21/31 |
| 2020/0134159 A1* | 4/2020 | Ford | G06F 21/46 |

* cited by examiner

*Primary Examiner* — Ali S Abyaneh
(74) *Attorney, Agent, or Firm* — Lee & Hayes, P.C.

(57) ABSTRACT

A system can be configured to determine whether a user is a human or a computer based on whether the user is capable of intuitive-based decision making to identify requested features. The system can generate a challenge that includes a question emphasizing mental shortcuts and associations developed through social and cultural interactions. The challenge also includes one or more media objects that are distinguishable to a human user due to the mental shortcuts and associations that permit selection of the correct media object in light of the question. Intuitive connections between statements and media objects are often difficult to implement within computer programs and algorithms due to the two-stage challenge requiring both comprehension and recognition of important features.

20 Claims, 7 Drawing Sheets

INTUITION-BASED CHALLENGES

BACKGROUND

Presently, Completely Automated Public Turing tests to tell Computers and Humans Apart (CAPTCHAs) are challenge-response tests that are used to determine whether a user interacting with a system is human or machine. As computers become more powerful and as artificial intelligence becomes more advanced, there is a continuing need to evolve the tests employed by challenge-response systems. In particular, improved challenge-response tests are needed due to advanced artificial intelligence programs and/or image recognition algorithms becoming able to interpret current challenge response tests with success rates approaching that of actual humans. Accordingly, the implementation of challenge-response tests that remain solvable for actual humans while presenting sufficient difficulty for algorithms would prevent unauthorized access to data, information, resources, etc. by unauthorized non-human users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
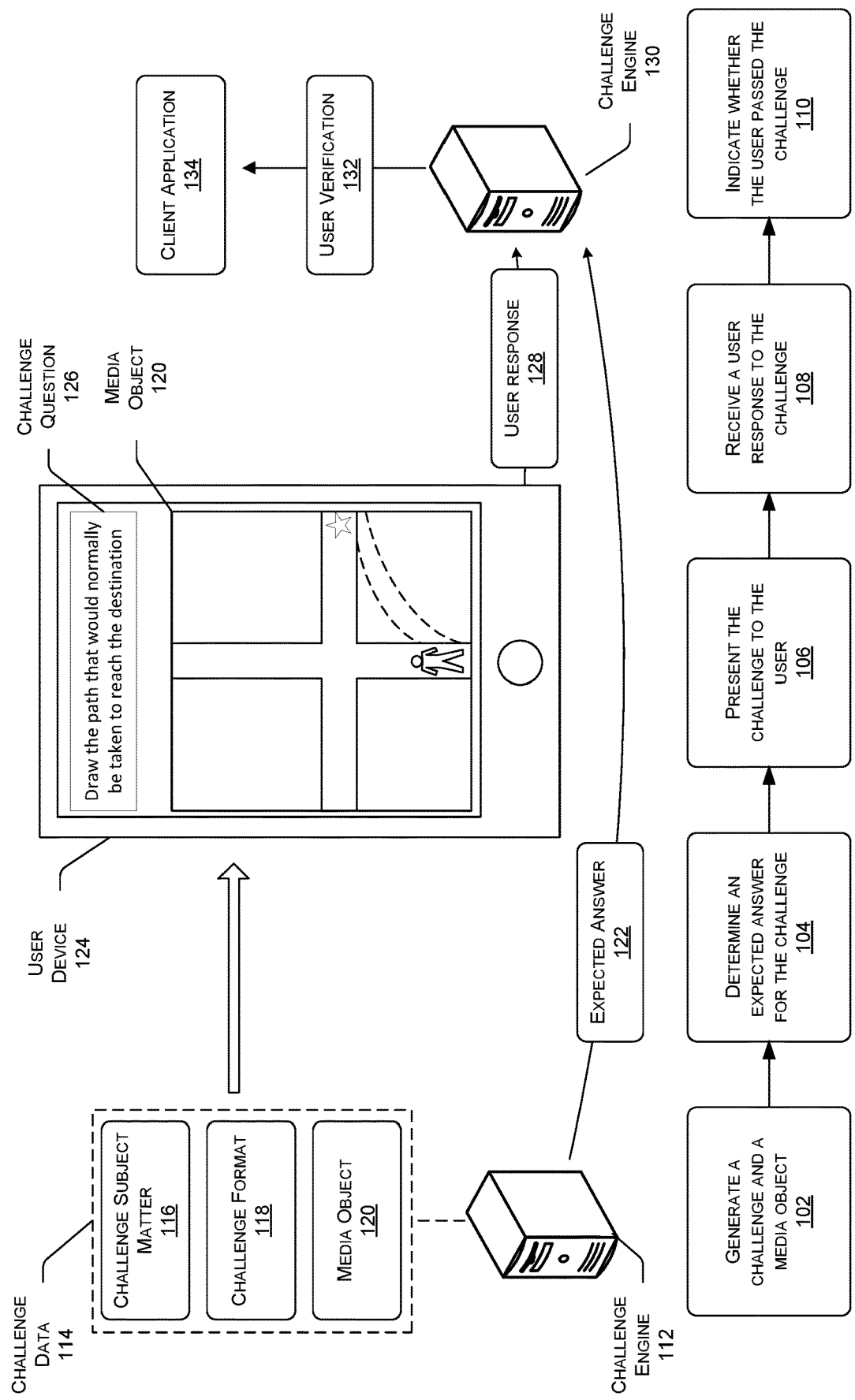
FIG. 1 illustrates an example method for generating a human intuition-based challenge by a challenge engine and determining whether the user is to be verified as a human for a client application by a verification engine.

Described herein are systems, methods, and/or processes for generating challenge-response tests that can be used to grant or deny access to a resource. Similarly, the systems, methods, and/or processes can generate challenge-response tests utilized to further verify that a user is a human and/or authenticate the identity of the user. In some embodiments, the present application relates to a challenge-response test that presents intuition-based problems. The intuition-based problems can include challenges that determine whether a user is capable of comprehending what the question is asking and recognizing the correct selection based on the question. In particular, the intuition-based problems can rely on social, cultural, and/or interpersonal principles that are commonly understood and utilized by humans in daily life, but are difficult for a computer and/or machine to interpret and act upon. It should be noted that social principles generally relate to interactions between individuals and/or groups. Additionally, cultural principals generally relate to ideas and standards that are commonly shared by groups and/or organizations that may or may not directly interact. Challenges can be relatively simple for humans to solve due to the utilization of mental heuristics (i.e., mental shortcuts, assumptions, associations, etc.) that are difficult to anticipate from a programming perspective. Accordingly, humans can be capable of determining the appropriate response based on intuitive knowledge while computers and/or machines may struggle to correctly interpret the challenge and may lack sufficient information to appropriately respond.

In some embodiments, intuition-based problems and/or challenges generally comprise a question, a task, a statement, or other challenge that involves a user making a determination based on knowledge that is commonly obtained within society and through common interactions between individuals. In particular, common occurrences in everyday life cause individuals to establish mental associations, shortcuts, heuristics, and connections (i.e., knowledge that allows individuals to make intuitive decisions) that allow the individuals to recognize qualities and associations within media objects that may not be inherent to the media objects themselves. In at least one embodiment, intuition can be defined as non-sequential information processing that influences judgements and/or decisions based on emotional and/or cognitive connections of individuals. Further, intuition-based decision making can be described as the process by which information acquired through associated learning and stored in long-term memory is unconsciously accessed and utilized to solve a presented problem.

In some embodiments, the described systems and methods can utilize a variety of challenge types to determine whether a user is a human or a computer/machine. For example, challenges can be generated based on art comparisons, common sense associations, social interactions, situation recognition, and other intuition-based identification/comparison tasks. In at least one embodiment, the challenge can be automatically generated by the described systems and methods. In at least one additional embodiment, the challenge can be generated from a selection of media objects stored in a media object database. In some additional embodiments, the challenge can be generated from direct or indirect questions that can be generated and/or obtained after a determination to challenge a user. In particular, a direct question includes the subject and/or the quality that is to be identified within a set of media objects. Additionally, an indirect question includes a reference and/or association that identifies the subject and/or the quality that the user is to identify within the set of media objects. In at least one embodiment, a media object can be formatted digital data that communicates a challenge, a question, a potential answer, a scenario, and/or other concepts related to the challenge to the user. Additionally, the media object can be a video, an image, an audio clip, an amount of text, and/or other formatted digital object that communicates information to the user.

In some embodiments, the challenge can be an art-based challenge that provides a set of images, paintings, pictures, sound clips, or other creative media to be analyzed and selected in response to a challenge. In at least one embodiment, art-based challenges can include comparative queries that request a user, in a direct question or indirect question, to compare a plurality of media objects and select the correct response. For instance, the challenge can recite a direct question requesting a user to determine which picture was likely drawn by a young child. Additionally, the challenge can display one or more images of art that is sophisticated and produced by a skilled artist alongside a single image that includes crude drawings of stick figures such as what a young child would produce. Accordingly, a human would understand the context of the question and be capable of assessing the presented images to determine that the crude drawings of stick figures would likely have been produced by a young child. Alternatively, the challenge can include an indirect question requesting that the user identify which drawing would be found on a refrigerator. Accordingly, a human would understand that the underlying question to the statement is requesting that they identify the drawing created by a young child due to the common association of parents hanging their children's creations from the refrigerator. It is to be appreciated that the above examples are not intended to limit the disclosure in any way and instead provide a reference to understand what the disclosure entails.

In some additional embodiments, the challenge can be a common-sense challenge that provides a set of images, sound clips, or other media to be analyzed and selected in response to the challenge. In particular, a user can be presented a set of media objects that display or describe a sequence of events, conditions commonly associated with or caused by a course of action, or logical response to input stimulus. In at least one embodiment, a user can be presented a challenge that requests that the user indicate an action that likely precedes another action. For instance, a user can be presented with an image of an individual lighting a fire and asked to indicate what action likely precedes the image. Additionally, the user can be presented a set of media items that includes an image of the individual (or other individuals) carrying firewood. Alternatively, a user can be presented with an image of a starting position, two paved paths that intersect at a 90-degree angle, one or more worn paths in a lawn around the paved paths, and a destination. Further, the user can be asked to select, within the images, portions of the image that are relevant to the challenge such as paths that people prefer to take between the starting position and the destination, paths people are supposed to take between the starting position and the destination, and other pathfinding operations that are modified by expectations and standard human behavior. It is to be appreciated that the above examples are not intended to limit the disclosure in any way and instead provide a reference to understand what the disclosure entails.

In some further embodiments, the challenge can be a social interaction challenge that provides a set of images, sound clips, or other media to be analyzed and selected in response to the challenge. In particular, a user can be presented a set of media objects that display or describe a sequence of events, a scene, or other situation involving an interaction involving one or more individuals. Additionally, the user can be instructed to determine an anticipated response or emotion that would be associated with the interaction described by the media objects. In at least one embodiment, the user can be instructed to determine which media object describes the emotion that would result from a certain scenario or what scenario would cause a particular emotion. It is to be appreciated that the above examples are not intended to limit the disclosure in any way and instead provide a reference to understand what the disclosure entails.

In addition to the above embodiments, a challenge may be designed to cause a user to utilize intuition-based decision making related to a variety of topics. In at least one embodiment, the user can be instructed to identify a picture that would be best for human survival (i.e., select one from a group including a picture of a forested river, a picture of a volcano, and a picture of the surface of Mars). In at least one additional embodiment, a user can be instructed to identify an individual who is the authority figure within a picture of an army/military setting or to determine what is expected to happen after a leader issues an instruction (i.e., drill sergeant orders recruits to start running laps). In at least one additional embodiment, a user can be asked what action should be performed to cross a road, wherein the correct answer is selecting the crosswalk button in the image. In at least one further embodiment, the challenge may instruct a user to determine what the ideal outcome is for a luck-based game (i.e., indicate on the dart board where the dart would have to land).

In some embodiments, the intuition-based challenge can utilize two conceptual gates when distinguishing human users from computers and/or machines. In particular, the challenge can be generated according to the described methods to utilize a comprehension gate and a recognition gate. The comprehension gate can be generally associated with a question of the challenge and involves a user correctly comprehending and/or interpreting what the question is asking. The recognition gate can be generally associated with a set of media objects for the challenge and involves the use recognizing information in the set of media objects based at least on correctly comprehending the question. Accordingly, for the user to successfully pass the challenge, the user much first successfully interpret what the question of the challenge is asking and then apply that comprehension to the set of media objects to recognize and select the correct answer for the challenge. In some additional embodiments, the comprehension and recognition gates can be conceptual hurdles that are components of the challenge. The comprehension gate can represent the logical connections between the terminology utilized in the question and the correct answer to the question. The recognition gate can represent the logical relationships between objects within the set of media objects that identify the correct answer based on the question. Additionally, passing the comprehension gate can indicate that a user has successfully recognized the underlying relationships between the terminology of the question and the qualities/concepts that identify the correct answer. Further, passing the recognition gate can be viewed as the recognition of the qualities and concepts within the set of media objects allowing the selection of the correct answer.

In at least one embodiment, the comprehension gate can involve the ability of the user to comprehend what the challenge is requesting. In particular, the comprehension gate can be associated with a question that causes a human user to intuitively understand the qualities and/or factors that should be considered when response to the challenge. Additionally, the comprehension gate can utilize different levels of directness when generating the challenge that are associated with either more obscure (i.e., more difficult) intuition-based connections being generated to test the comprehension of a user and/or involving multiple intuition-based connections to reach the correct interpretation. Further, the comprehension gate can be utilized to generate one or more questions that can at least partially rely upon the same or a similar interpretation while utilizing different sentence structures and logic paths to correctly answer the resulting question. For example, the user can be presented with a challenge with instructions to identify which of one or more images was drawn by a young child or to determine which painting would could be found on a refrigerator. While interpreting such challenges a user would have to make determinations as to what qualifies as an image drawn by a young child, what image is a painting, which painting would be found on a refrigerator, and other intuition-based interpretations that are formed based on social, cultural, and/or interpersonal experiences accrued by individuals over the course of their life. Additionally, there are underlying assumptions that are associated with the challenges that are not inherent to the challenge itself such as the qualities that are commonly associated with a painting done by a young child and that paintings on a refrigerator are usually those made by a young child.

In at least one additional embodiment, the recognition gate involves the ability of the user to effectively apply the associations, qualities, and/or traits extracted from the question to determine a media object from a set of media objects that is the correct answer to the question. In particular, the recognition gate involves the ability of the user to utilize the associations between the terminology of the question and the underlying request to identify pertinent features of the media objects. Continuing from the above examples, once the user determines that images drawn by young children commonly include basic and/or illogical themes, errors within the image, simple techniques, and other features, the user can then examine the set of media objects to identify a media object that contains some or all of the above features.

In some embodiments, the challenge can be presented to the user via a user device. In particular, the question, the set of media objects, and other components of the challenge can be presented to the user within a visual/graphic user interface, via audio prompts, through text-based description, or some combination of the described presentation methods. Additionally, the challenge can be presented to the user visually via a visual display of the user device and/or audibly via one or more speakers of the user device. Similarly, the user can respond to the challenge via touch inputs on a touch-screen interface, verbal inputs recorded via a microphone, a mouse click, keyboard inputs, and other inputs received via the user device.

Currently, CAPTCHA systems and other public Turing-type tests present a straightforward challenge to examine an image and identify specific features of that image to distinguish between human users and computers, chatbots, machine learning algorithms, neural networks, and other digital users. In particular, Turing-type tests provide a method to verify that a user is a human user to prevent automated access to a service, database, or other digital resource by presenting a challenge-response test to the user requesting access to the digital resource. The challenge response test can include a question or challenge designed to be extremely difficult for a computer program to respond to while remaining solvable for humans. By implementing a challenge to prevent access to digital resources by computer programs, the digital resources can avoid the extra load on servers, databases, and other aspects of the digital that may be caused by non-human users. In general, computer programs access, parse, and interact with data at a rate far exceeding that of human users. While a single computer program accessing the digital resource may not prove to be an unbearable load, the systematic accessing of the digital resource by a multitude of computer programs or instances of computer programs can prevent human users from accessing the digital resource or make the digital resource inaccessible in general. A digital resource can be a database, a data structure, a web page, a web resource (i.e., a search engine, a web portal, a computation engine, etc.), and/or other resource that can service a plurality of local and/or remote users to provide access to information or services.

In older CAPTCHAs and Turing-type tests, a user is commonly asked to identify letters and numbers with in a distorted image. In newer challenge-response tests, the user is asked to identify features such as traffic lights, crosswalks, school buses, sports cars, or other objects that are easily defined and have set definitions. In comparison, the described systems and methods utilize indirect references to specific features and associations that can be universal or nearly universal within a society, culture, country, or other collection of individual humans. Accordingly, where breaking previous challenge-response systems can be accomplished by the training of an algorithm, machine learning program, or other automated system to recognize specific items or keywords within an image, the described systems and methods add another layer of difficulty for automated systems to bypass the challenge while minimizing the difficult for actual human users. Instead of simply providing an object or objects to identify within an image, the described systems and methods cause the user to intuitively understand what is being asked by the challenge through the utilization of intuitive conclusions developed through a lifetime of experience. Challenge-response tests utilizing intuition-based questions become easier for humans to correctly interpret and answer due to the foundation for the challenges being built from potentially decades of reinforcement that can be extremely difficult to implement in a program or algorithm. As processing power becomes less costly, as machine learning and computer science algorithms become more sophisticated, and as machine object recognition algorithms become more accessible, more sophisticated challenges for distinguishing between human and non-human users are needed.

FIG. 1 illustrates an example method for generating a human intuition-based challenge-response test by a challenge engine and determining whether the user is to be verified as a human for a client application by a verification engine. In particular, FIG. 1 illustrates the generation and presentation of a human intuition-based challenge to a user and processing the results for a client application. It should be noted that, while FIG. 1 depicts a single challenge that is presentable to a user, the disclosure is not limited to presenting a single challenge to a single user. For instance, a user can be presented with multiple challenge-response tests where appropriate. Alternatively, a challenge-response test can be presented to multiple users. In at least one embodiment, the user can be presented with multiple sequential challenge-response tests where they fail to correctly respond to a first challenge-response test.

At block 102, a challenge engine 112 can generate challenge data 114 to be used within a challenge for a user. In particular, the challenge data 114 can comprise a challenge subject matter 116, a challenge format 118, and a media object 120. Generally, the challenge subject matter 116 can determine what the specific scenario that is to be targeted by the challenge. Additionally, the challenge format can determine the challenge type and how the challenge should be presented to the user. Further, the media object 120 can be formatted to represent the challenge subject matter 116 and the challenge format 118 when the challenge is presented to the user. For example, the challenge format 118 can indicate that a challenge to be presented to the user is a pathfinding challenge where the user is to indicate a path between a starting position and a destination position via a user interface. Additionally, the challenge subject matter 116 can indicate the actual starting position, the actual destination position, potential paths between the destinations, and the terminology determined for the challenge. Further, the media object 120 can be generated by the challenge engine 112 to visually present the challenge subject matter 116, formatted in a manner consistent with the challenge format 118, to the user.

At block 104, the challenge engine 112 can determine an expected answer 122 for the challenge. The expected answer 122 is the correct answer given the information represented by the challenge subject matter 116. In some embodiments, the challenge subject matter 116 can include specific expected answers 122 that are selected in tandem with the actual starting position, the actual destination position, the potential paths, and the terminology of the challenge. In some additional embodiments, the challenge engine 112 can operate to determine the expected answer 122 based on keywords that are defined to indicate a path of the potential paths that is the correct path for the challenge subject matter 116 and the challenge format 118. Accordingly, the expected answer 122 can be directly associated with a given challenge subject matter 116 or determined based on the keywords associated with a specific instance of the given challenge subject matter 116.

At block 108, the challenge can be presented to the user 106. In particular, the challenge can be presented to the user via user device 124. Additionally, the challenge can be presented to the user in the form of a challenge question 126 that provides instructions to the user regarding the challenge and the media object 120. In some embodiments, the challenge question 126 can indicate that the user is to respond on the media object 120. Additionally, the media object 120 can be formatted so that, when the user responds via the user device 124 (i.e., by touch inputs on a touch-screen interface), the user response 128 is associated with specific areas on the media object 120.

At block 110, a verification engine 130 can indicate whether the user passed the challenge via a user verification 132 transmitted to a client application 134. In some embodiments, the verification engine 130 can receive the expected answer 122 from the challenge engine 112 and the user response 128 associated with the challenge presented via the user device 124. Additionally, the verification engine 130 can determine a user selected path within media object 120 based on the user response 128. From the user selected path, the verification engine 130 can determine whether the user associated with the user device 124 successfully selected the expected answer 122. Further, if the user response 128 does match the expected answer 122, the verification engine 130 can determine that the user is a human user. Alternatively, if the user response 128 does not match the expected answer 122, the verification engine 130 can determine that the user is not a human user (or that the user is a human user that provided an incorrect answer). Accordingly, the user verification 132 can be formatted to indicate the results of the user response 128 to the client application 134 (i.e., a web application or other digital resource that has implemented a human intuition-based challenge as a protection against computer programs imitating human users).

In at least one embodiment, the user verification 132 can be sent to the client application 134 and cause the client application 134 to present an indication that the user has passed the challenge or that the user has failed the challenge. In at least one additional embodiment, the user verification 132 can be sent to the client application and not presented to the user. In particular, the verification engine 130 can determine that the user is a program and/or algorithm and determine that the computer user should not be presented with an indication of failure. Instead, the client application 134 can be informed such that the user determined to be a program and/or algorithm can be refused access to the resource or another challenge can be requested. Further, the user verification 132 can include an indication that tracks the number of challenge-response test failures that are associated with the user.

Figure 2:
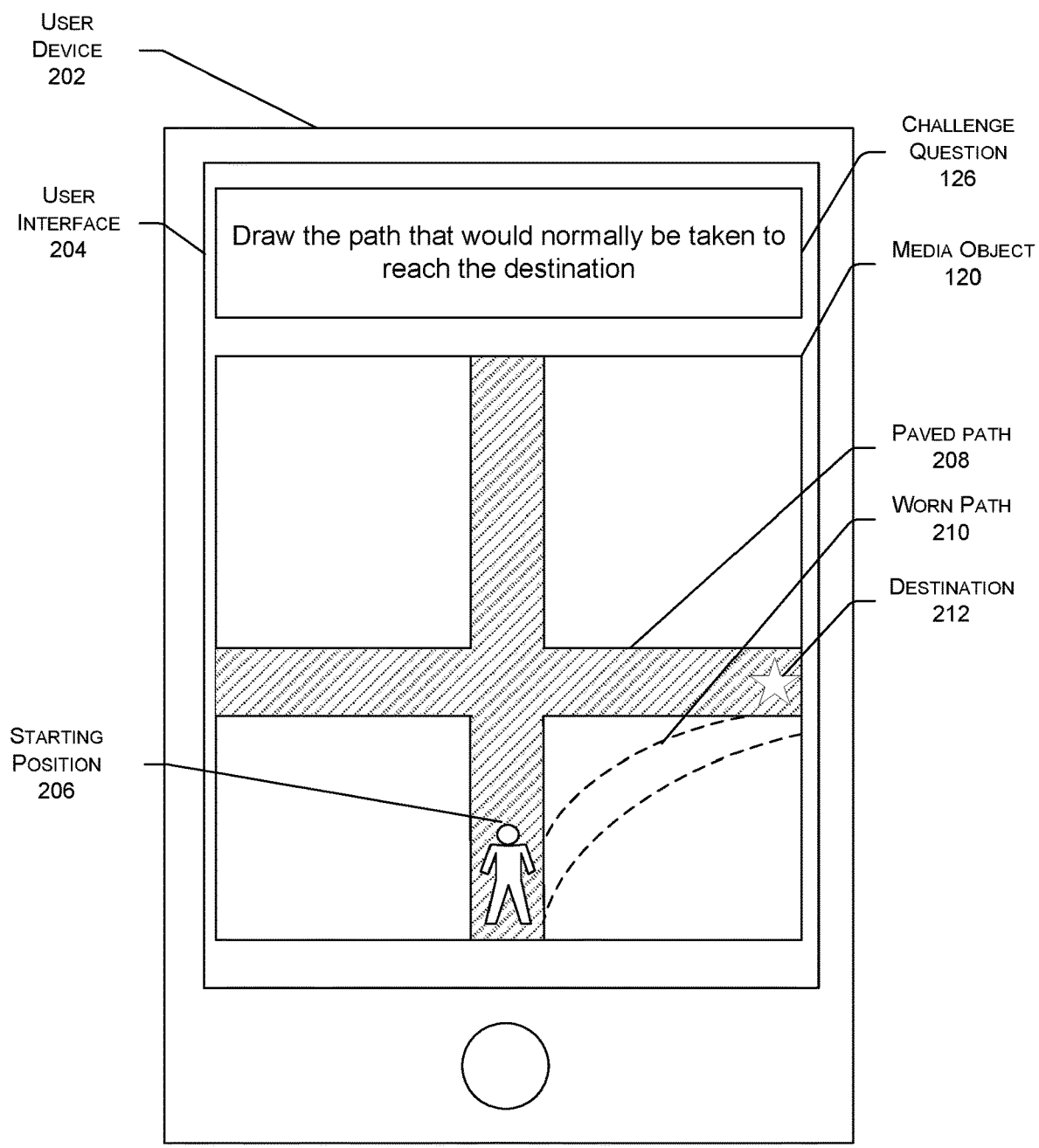
FIG. 2 illustrates an example challenge that requires a user performing a pathfinding task within a media object presented via a user device that requires the user to utilize intuition-based decision making.

FIG. 2 illustrates an example challenge that requires a user performing a pathfinding task within a media object presented via a user device that requires the user to utilize intuition-based decision making. It should be noted that FIG. 2 further illustrates many concepts briefly recited by FIG. 1 in greater detail for clarity, but is not intended to limit the scope of this disclosure. In particular, media object 122 and challenge question 128 are presented to a user via user device 202 and user interface 204.

In some embodiments, user device 202 can be any device supporting communication technologies, processing capabilities, and the ability to exchange information with a user. Additionally, while FIG. 2 depicts a combination of a textual and a graphical user interface that are visually displayed, user interface 204 can present the media object 122 and the challenge question 128 to the user via audio cues or other visual presentation methods.

In some embodiments, where media object 122 and challenge question 128 are formatted to present a pathfinding challenge to the user, wherein the media object 122 can comprise a starting position 206, one or more paved paths 208, one or more worn paths 210, and a destination 212. Additionally, the starting position 206 and the destination 212 can be optionally be labeled to indicate the relative positions or designed to visually indicate the starting position 206 and the destination 212 to the user. Similarly, the paved path 208 and the worn path 210 can be labeled to indicate the status of the displayed paths or be visually designed to indicate concrete, asphalt, worn dirt, or other paths within the image. Accordingly, the design of the challenge question 128 can indicate to a human user what answer is expected by the challenge. For example, the challenge question 128 recites "draw the path that would normally be taken to reach the destination." While the media object 122 displays official paved paths 208, the worn path 210 indicates a preferred path for individuals moving between the starting position 206 and the destination 212. Additionally, the terminology of the challenge question 128 can be altered to cause the user to draw a path along the paved path 208 by utilizing terms like "draw the path that the property owners want to be used to reach the destination." Accordingly, the media object 122 and the challenge question 128 can be formatted to provide contextual clues that enable a human user to identify the expected answer for the challenge from the potential answers.

In some additional embodiments, the media object 122 can present a two-dimensional (2D) or a three-dimensional (3D) pathfinding challenge to the user. The media object 122 can be formatted to display one or more starting positions 206, one or more official paths 208, one or more human created paths 210, and one or more destinations 212 within the 2D or 3D space. Additional features that can be introduced to the media object 122 can include obstacles, barriers, and other features that may require alternative paths to be utilized and/or incentivize selection of the expected answer for the challenge question 128. Further, user information can be utilized to modify the expected answer based on cultural expectations associated with a user, personal tendencies, and other modifications on the path a user would be expected to select based on user information provided to the challenge generation engine. It should be noted that while the above examples discuss selection of a single path between a starting point 206 and a destination 212, a challenge can cause the user to select a plurality of paths between the one or more starting points 206 and the one or more destinations 212.

In at least one embodiment, the media object 122 can present a challenge to the user that causes the user to select or traverse a path within an augmented reality or virtual reality space. Augmented reality can refer a scenario where a device captures information regarding the environment surrounding the user and depicts that environment on a display of a user device. The depicted environment on the display of the user device can be modified to present additional information that augments the environment of the user. Accordingly, the augmented reality pathfinding challenge can modify the depicted environment to display one or more starting positions 206, one or more official paths 208, one or more human created paths 210, and one or more destinations 212 within the depicted environment. Similarly, virtual reality can refer to a scenario where a virtual environment is generated and depicted for a user. The virtual environment can include one or more starting positions 206, one or more official paths 208, one or more human created paths 210, and one or more destinations 212 and instruct the user to traverse or select a path or paths between the one or more starting positions 206 and the one or more destinations 212 within the virtual environment.

Figure 3:
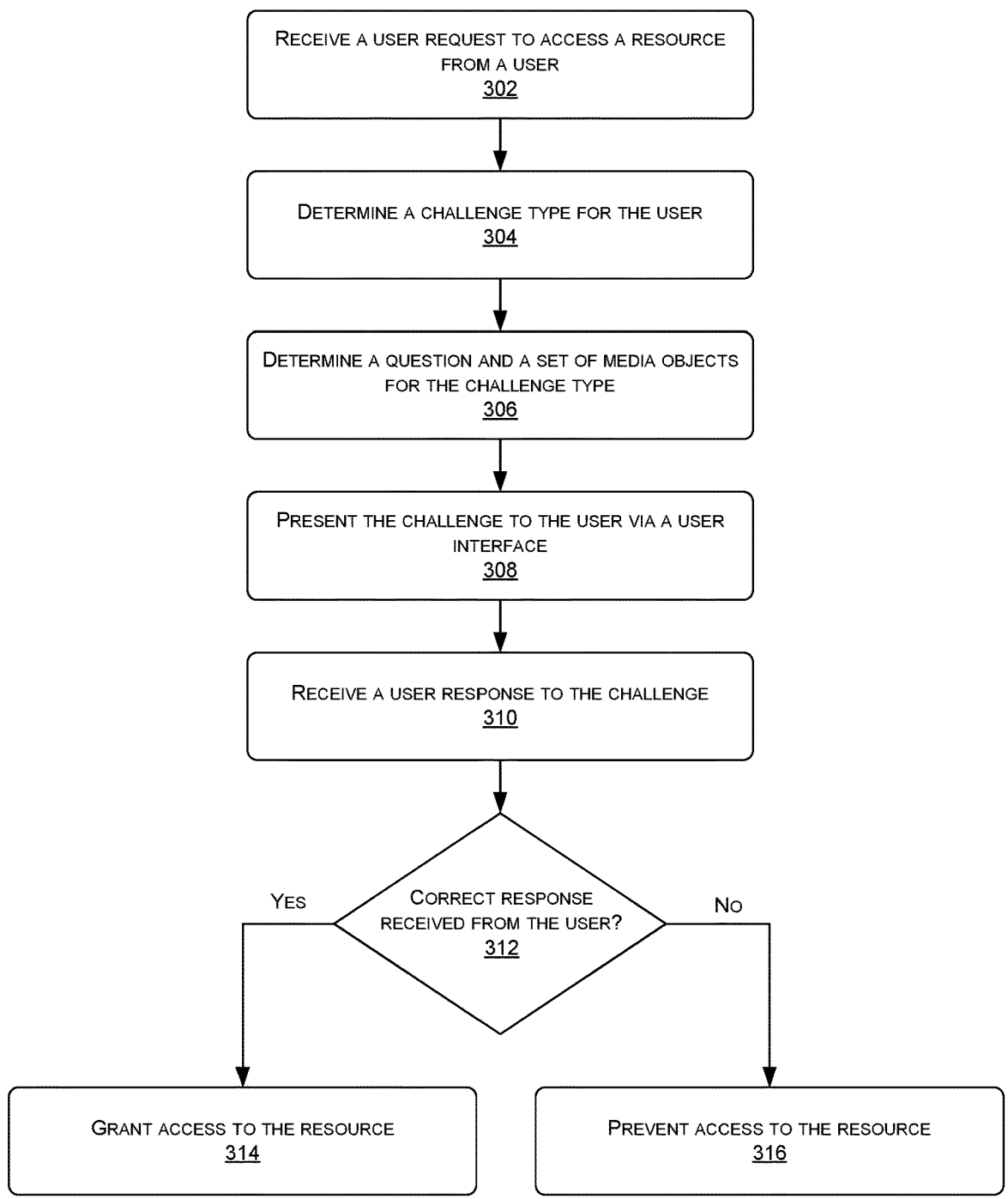
FIG. 3 illustrates an example method for responding to a user request to access a resource by generating a challenge to verify whether the user is to be given access to the resource.

FIG. 3 illustrates an example method 300 for responding to a user request to access a resource by generating a challenge to verify whether the user is to be given access to the resource. In some embodiments, an example of a verification engine response to a user request through the presentation of a challenge to the user and ultimately determining whether an individual is to be granted access to the resource. It is understood that the illustrated method of FIG. 3 merely provides an example of the many different types of functional arrangements that may be employed to implement the operation of the portion of the described systems and methods. Additionally, while the embodiments described by this application are generally directed to the verification that a user is a human, they can also be utilized to confirm authentication and authorization of users by utilizing information specific to an associated role and/or position.

At block 302, a system can receive an indication that a user has requested access to a resource (e.g., data, information, a website, a webpage, etc.), via a user request. In some embodiments, the system can receive the user request or an external system can transmit an indication of the user request to access the resource. It should be noted that while this example discusses the scenario where a user has attempted to access the resource to trigger the system and the subsequent challenge, the challenge can be generated based on a message or indication that is transmitted based on user activity that occurs after access has been granted to the resource. For example, if the user is navigating instances of the resource (e.g., webpages, form fields, etc.) and/or completing actions faster than commonly associated with a user, the system can determine that a challenge is to be transmitted to the user to verify that the user is a human.

In some additional embodiments, a system can determine that a user is to be verified by the described systems and methods. In particular, the system can receive a request for verification of a user from an external service or system. Alternatively, the system can be integrated with a monitoring program that determines whether a user should be re-verified in light of recent activity. In some additional embodiments, the system can obtain the request to access a digital resource, a content page, a web page, or any content that a user attempts to access. In particular, an administrator associated with the content can elect to secure access to or continued access to the content behind a human-intuition based challenge-response test. Accordingly, the user can gain access to or continued access to the content by passing the challenge-response test.

In some further embodiments, a system administrator can determine that a user is to be verified by the described systems and methods. In particular, the system administrator can establish user behavior, system processes, and/or manual triggers that cause a challenge to be generated and presented to the user. Alternatively, the system administrator can embed a challenge generation engine within system processes that cause the user to receive a challenge when they reach a specified point within the system process.

At block 304, the system can determine a challenge type for the user. As discussed above, multiple types of challenges can be interchangeably generated in response to the user request. In some embodiments, the challenge type can be selected from object-based challenge formats such as art-based challenges, object recognition challenges, and object generation challenges. An art-based challenge can cause the user to identify and/or select one or more pieces of art based on qualities identified through the question of the challenge including a likely artist, a quality of the art, a subject of the art, a scene depicted by the art, how the subject of the art would be used by humans, and other aspects of the art presented to the user. An object recognition challenge can cause the user to identify and/or select an object within one or more media objects or one or more portions of media objects that include the object associated with the question. An object generation challenge can cause the user to create or capture an image or other description of an object based on one or more media objects presented in association with the challenge, the question of the challenge, or other indications that cause a human user to intuitively understand the object and/or type of object to be created, captured, or otherwise provided for the challenge. It should be noted that the above challenge types and examples of the challenge types are not intended to limit the scope of this disclosure, but instead provide references for the type and/or form of challenges that can be generated and presented.

In some additional embodiments, the challenge type can be selected from information processing challenge formats such as common-sense challenges, awareness challenges, and employment information challenges. A common-sense challenge can cause the user to identify and/or select one or more media objects or one or more portions of a presented media object based on common-sense or heuristic thinking associated with the challenge. An awareness challenge can cause a user to identify one or more media objects or one or more portions of media objects that include a feature that a human should be aware of, threatened by, comforted by, or other situational relationship between an individual and the feature. An employment information challenge can cause the user to identify and/or select one or more media objects and/or one or more portions of media objects that are associated with an occupation, workplace, and/or professional knowledge associated with the user. It should be noted that the above challenge types and examples of the challenge types are not intended to limit the scope of this disclosure, but instead provide references for the type and/or form of challenges that can be generated and presented.

In some further embodiments, the challenge type can be selected from interpersonal interaction challenge formats such as social interaction challenges, social custom challenges, and cultural challenges. A social interaction challenge can cause the user to identify and/or select one or more likely outcomes, emotional responses, or other aspects of a social interaction involving a plurality of individuals. A social custom challenge can cause the user to identify and/or select one or more outcomes, social expectations, social customs, or other aspects associated with an organization or society associated with the question of the challenge. A cultural challenge can cause the user to identify and/or select one or more outcomes, cultural expectations, cultural customs, or other cultural features associated with a particular organization and/or culture. It should be noted that the above challenge types and examples of the challenge types are not intended to limit the scope of this disclosure, but instead provide references for the type and/or form of challenges that can be generated and presented.

In some embodiments, the above challenge types can be presented via virtual reality and augmented reality systems. In particular, the challenges can be presented within a virtual reality or augmented reality space. Alternatively, the challenges can utilize the virtual reality space to place the user within one or more media objects that they are to interact with based on the question or to modify the augmented reality space to alter surroundings of the user based on the one or more media objects. Additionally, the user can interact with the virtual environment or the augmented environment (i.e., select, capture, sort, move, etc.) based on the challenge. Further, a challenge generation engine can operate to recognize and incorporate objects within the virtual environment or augmented environment of the user when generating the challenge.

In at least one embodiment, the challenge type can be selected based at least on information received from an external system associated with a user profile. In particular, the system can receive user information that can indicate that the user has experience with a particular social custom, expectation, media consumption, or other indicator that the user should perform well interpreting intuitive information within a challenge type. For example, where a user is located in the United States (US), owning a firearm may not be a feature that would stand out, but a user located in the United Kingdom (UK) may recognize owning a firearm as an oddity. Accordingly, a challenge that asks the UK resident to identify an object that would be strange to own, the image including a firearm in a group of objects would likely be selected. Utilization of user information, including location, profession, interests, and other information can enable more accurate challenges to be generated for the user. Further, associations between the user and potential challenges may indicate that certain challenges would be more intuitive for certain individuals and less intuitive for others. Modifying of challenge categories that can be presented to a user can prevent false positives from occurring where the user is unable to correctly respond to the challenge. In general, the user information can indicate demographic information that identifies the user as someone associated with a specific age, gender, religion, income level, occupation, hobby, and/or other demographic. Similarly, the user information can indicate a geographic location, purchase history, search history, browsing history, items placed in a saved-items list, social media information, previous challenges presented to the user, user responses to previous challenges, resources previously accessed by the user, and other user consumption information.

In at least one additional embodiment, the challenge type can be randomly selected from the pool of challenge types. In particular, where the user has no pertinent information that indicates suitable challenge types, has already passed a first challenge type and a system has determined that a second challenge should be presented, and/or has indicated that localization information is not to be collected. Alternatively, the user information can be utilized to assign a heavier weight to certain challenge type in a random selection. Further, the user information can be utilized to remove certain challenge types from the challenge pool upon a determination that a user may not intuitively understand the challenge if it were presented.

In some embodiments, the system can determine a comprehension gate and a recognition gate for the challenge. In particular, the comprehension gate can be a question, query, or problem that is presented for the user to respond to. Additionally, the recognition gate can be a quality and/or a feature that is targeted by the question (i.e., the comprehension gate). Further, the comprehension gate can be determined based on the qualities or features of the recognition gate and the recognition gate can be determined based on the qualities and/or features targeted by the comprehension gate. In at least one embodiment, the comprehension gate can be a question, query, or problem that targets a concept that has been randomly selected by the system from a concept database or selected according to information associated with a user profile.

In some additional embodiments, once a challenge type has been determined, the challenge can be formatted to include a comprehension gate that targets a concept that has been identified by the system. For example, the comprehension gate can instruct a user to identify a picture that has been drawn by a young child. Accordingly, the system identifies question formats and/or pre-generated questions that are associated with determining whether a presented image was created by a young child. Additionally, the system can fill out the question formats with terminology that has been associated with determining whether a presented image was created by a young child. For instance, the comprehension gate can utilize terms such as unsophisticated, simplistic, childish, whimsical and/or other terms that may be associated with art created by a young child. Further the comprehension gate can utilize common concepts/assumptions that drawings made by young children can be found on a home refrigerator, on an office desk, in a school setting, and/or other scenarios. Once the comprehension gate question is determined, the qualities and/or features used to fill out question formats or associated with the pre-generated questions can be further associated with media objects. The media objects can then be utilized as components of the recognition gate.

In some further embodiments, the challenge can be formatted to include a recognition gate that targets a quality or feature that is depicted or described by a media object. For example, the recognition gate can include photographs of landscapes from around the world that are associated with landmarks or other famous sights that individuals would want to visit. It should be noted that some embodiments can determine the recognition gate prior to the comprehension gate. Based on the selection of vacation destinations as potential media objects, the comprehension gate can be determined to be the concept of where an individual would like to visit during a vacation. Accordingly, the question can be formatted to cause a user to identify a photograph of a non-scenic landscape (i.e., standard city block, inside a house, etc.), where the challenge instructs the user to identify a location that would be an unlikely vacation destination. It should be noted that the system can determine the recognition gate and the comprehension gate in any order or simultaneously.

At block 306, the system can determine a question and a set of media objects for the challenge type. In some embodiments, the system can determine a set of media objects based on the challenge. In particular, the set of media objects includes one or more media objects that are selected based on the qualities or features that the recognition gate utilizes to filter human users from programs/algorithms and are associated with the concept used to form the question of the comprehension gate. Once one or more media objects are identified as associated with the comprehension gate and recognition gate, the system can select a correct answer that the comprehension gate directs a human user to indicate. In at least one embodiment, the system can select only a single media object for the set of media objects where the comprehension gate directs the user to indicate a portion of the image as an answer. Accordingly, the media object can be selected based on the media object including multiple variations of the qualities and/or features of the comprehension gate. For example, a media object can be a map of an area, having multiple variations of starting locations, destinations, and paths (i.e., paved paths, worn paths across lawns, etc.). Additionally, the system can format the media object to display a single variation with multiple selectable options or multiple variations with individual options displayed. In at least one additional embodiment, the system can select a single media object that represents the concept from the comprehension gate with one or more additional objects that are only associated with the qualities and/or features of the recognition gate and/or one or more further objects that are unassociated with the comprehension gate and recognition gate. For example, where the system instructs a user to choose a painting drawn by a young child, the correct media object may display a young child's drawing hung on a refrigerator alongside a piece of fine art hung over a fireplace and a photograph of a sunset.

In some additional embodiments, the challenge type can further be considered when determining a comprehension gate and a recognition gate. In particular, individual challenge types can be associated with particular question formats, question concepts, media object features, and media object qualities. Additionally, a core engine of the system can determine the media object for the challenge through automatic generation of media objects, selection of media objects from a media object library, and/or modification of media objects available to the core engine.

At blocks 308, the system can present the challenge to the user via a user interface. In some embodiments, the user interface can be a graphical user interface that is presented to the user on a display of a user device. In particular, the system can present the set of media objects to the user in various formats. Additionally, the one or more media objects from the set of media object can be simultaneously or sequentially displayed to the user in association with the question. In some additional embodiments, the user interface can be a series of audio prompts that are emitted via an audio playback device (i.e., headphones, speakers, etc.).

In at least one embodiment, a challenge can be presented, by the system, as a cause and effect scenario. In particular, the challenge can be presented to the user in a format where a first image is shown that depicts an initial configuration of a scene. The scene can depict spatial relationships between individuals and objects, can be animated to display a short sequence of events (i.e., someone having a bucket of water dumped on them), or can be configured to depict other interactions between people and objects. Additionally, the user can be presented a question that is formatted to trigger intuitive decision making and essentially prompt the user to provide an answer indicating the likely result for a given scenario. For instance, the initial scene can depict a first person dumping water on an unsuspecting second person and the challenge can include a question that states "what will person B feel towards person A after this scene?" Subsequently, the challenge can display one or more additional media objects that display a series of faces, one of the faces displaying a likely reaction (i.e., shock, anger, surprise, etc.) and one or more faces displaying unlikely reactions (i.e., happiness, excitement, etc.). It should be noted that the above example is not intended to limit the present disclosure, but instead illustrates a potential embodiment of intuition-based challenges and challenge-response tests.

At block 310, a user response to the challenge can be received by the system. In some embodiments, the challenge can cause the set of media devices to be presented to the user and prompt the user to select an answer. In particular, the set of media objects can include one or more media objects that can display multiple potential variation (i.e., where a single media object is presented), individual variations of an initial scene (i.e., 'what is the likely result of a scenario' challenges), independent scenes that the user is prompted to identify a particular feature from, or other methods of triggering intuitive decision making by the user. Additionally, the user can respond to the challenge through selecting a media object of the one or more presented media objects, indicating an answer within a media object presented to the user, providing an indication of a media object of the one or more media objects, or other method of providing an answer to the challenge. For example, the user can touch an object displayed on a touch screen interface of a user device, enter an indicator association with a media object of the one or more media objects, verbally enter a response to the challenge, or otherwise provide an answer to the challenge.

At block 312, the system can determine whether the user response is the correct response or is an incorrect response to the challenge. In some embodiments, where the user selects the correct response the system can grant access to the resource as described by block 314. In some additional embodiments, where the user selects an incorrect response the system can prevent access to the resource as described by block 316. As discussed above, with respect to FIG. 1, the user response can be determined as the correct response or the incorrect response based on an expected answer determined during generation of the challenge. The expected answer can be directly associated with the concepts, qualities, and features utilized to generate the challenge or be generated based on keywords and identifying aspects of the challenge format and subject matter. Once the expected answer is generated, user response can be compared to the expected answer stored in association with the challenge. Based on the comparison, the user response can be identified as a correct response or an incorrect response for the challenge.

At blocks 314 and 316, the system can optionally grant the user access to the resource or prevent access to the resource. In some embodiments, the user can either be permitted to access and/or utilize the resource or, where the user has already received access to the resource, is permitted to continue accessing the resource without interruption. In some additional embodiments, the user can either be refused access to the resource or, where the user has already received access to the resource, is blocked from further access to the resource. Additionally, the user can either be rejected from accessing the resource or can be presented an additional challenge in attempt to ensure that the user has been correctly blocked from the resource.

Figure 4:
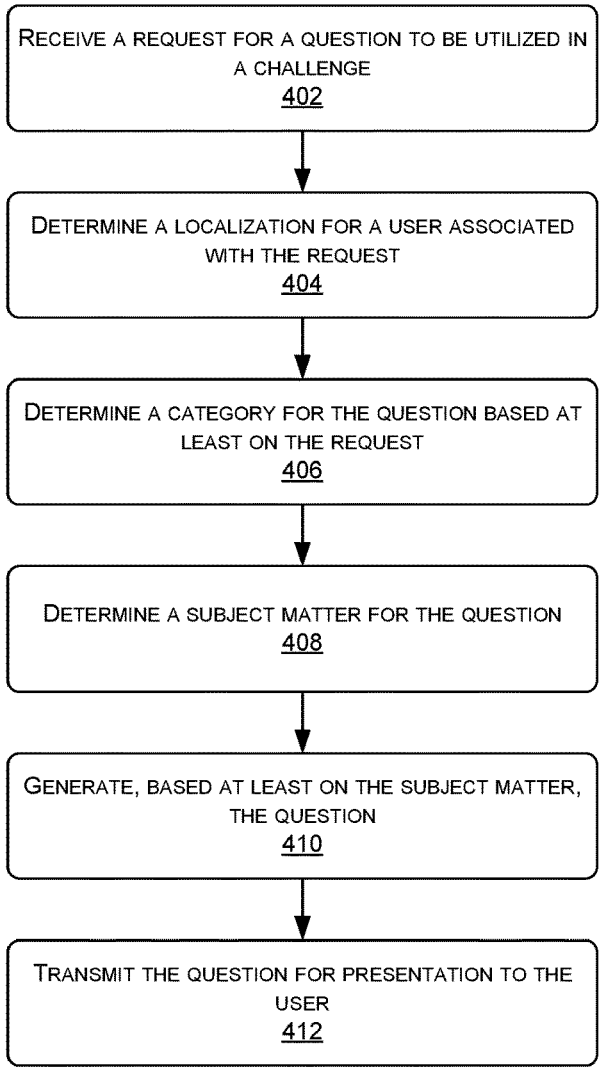
FIG. 4 illustrates an example method for generating a comprehension gate based on a challenge type that utilizes direct and/or indirect intuitive associations for an intuition-based challenge.

FIG. 4 illustrates an example method 400 for generating a comprehension gate based on a challenge type that utilizes direct and/or indirect intuitive associations for an intuition-based challenge. In some embodiments, this can be performed in a manner similar to that described by FIG. 1 at block 104.

At block 402, the system can receive a request for a question to be utilized in a challenge. In some embodiments, the request can be received from an external system that has received a user request to access a resource, has determined that a user is to undergo re-verification, has determined that a user should be authenticated, or other instance that involves user verification. In particular, an administrator of a digital resource can establish an access portal that redirects the user to a verification webpage associated with the system. Alternatively, the administrator can embed the system and/or an access point for the system within the access portal for the resource. Accordingly, a user that attempts to gain access to the digital resource can be redirected to the system for verification. In some additional embodiments, the request can be received from an internal system of the digital resource that has determined that a user associated with the user request is to be verified. In particular, the internal system can determine that a user that has previously been granted access to a resource is performing operations at a rate that is above what is expected for a human user, is completing form fields nearly instantly, or is otherwise navigating the resource in an unnatural manner. Accordingly, the user can be redirected from continued access of the digital resource until the user is re-verified by the system. Further, as discussed with respect to block 302 above, the system can also determine that a challenge is to be generated based on user actions that have been detected or be activated by a system administrator that establishes triggers for the challenge generation engine or embeds the challenge generation engine within an application.

At block 404, the system can determine a localization for a user associated with the request. In some embodiments, a localization can be defined as a representation of intrinsic qualities associated with a user. A localization can be as limited as an identification of a country where the user resides or as extensive as to include details regarding occupation, interests, hobbies, cultural associations, social associations, and other organizational associations that have been disclosed by the user or obtained from a client system or application regarding the user (i.e., browsing history, user profile, etc.). From the localization, the system can determine categories of challenges that would be intuitive for the user and omit challenges that would be indecipherable for the user. For example, a resident of Germany, South Africa, or Japan may be unfamiliar with Brazilian culture. Accordingly, challenges based on common Brazilian concepts or socially significant aspects of life may be difficult for actual human users not from that localization to understand. Further, presentation of challenges to mismatched users may result in false positive determinations that a user is a program or algorithm, causing a detrimental impact on the user experience.

In some additional embodiments, certain categories of challenges can be universal or nearly universal. For example, nearly every culture on the planet recognizes a smile as a positive response in a situation. Similarly, ideas of dangerous environments, commonly edible foods, and other consistent experiences can be utilized in scenarios where a localization cannot be determined. Accordingly, while a localization of a user can be beneficial to the generation of a challenge, it is not necessary to effectively present an intuition-based challenge. Additionally, some users can be determined to respond to universal categories of challenges that avoid differences between cultures, societies, and individual nuances by employing fundamental feelings as a basis for the challenge (i.e., utilizing fundamental emotions such as fear, awe, happiness, etc.).

At block 406, the system can determine a category for the question in response to receiving the request, similar to the process discussed with respect to block 204. In some embodiments, the category for generating the question can be randomly selected from a number of potential categories that can be defined for the system and be stored within a database associated with the system. In some additional embodiments, the categories can include general keywords that are indicate subject matters associated with individual categories and connections within categories that can be utilized to modify and iterate upon the concepts described by the categories within the system. Further, user information and associations with the subject matters of individual categories and how previous users sharing aspects of the user information have responded to the challenges can influence the selection of the category to avoid potentially ambiguous challenges from being presented to the user. Accordingly, the system can filter potential challenge categories or weigh potential challenge categories based on localization information.

At block 408, the system can determine a subject matter for the question. In some embodiments, the subject matter can be randomly selected from any available subject matter or any subject matter within a previously selected challenge category. In some additional embodiments, the subject matter can be selected utilizing localization information to further tailor the challenge to the user. In particular, some users that receive challenges can be associated with aspects of culture and society that are not universal outside of specific groups and organizations. For example, individuals who are parents or have served in the military can be familiar with traditions, concepts, and information that is not intuitive to individuals outside of those groups. Similarly, occupational knowledge that has become intuitive to individuals within an industry can be non-obvious to individuals outside of the industry.

It should be noted that challenge categories can generally be associated with broad concepts such as social expectations within a region, cultural phenomena within a time period and/or country, and other overarching concepts. In comparison, subject matters for challenges can generally be associated with individual topics such as locations that would be popular vacation locations, determining pictures created by young children, and other specific instances of the overarching concepts.

At block 410, the system can generate the question for the challenge. In some embodiments, the question can be generated as a straightforward statement requesting the user to identify a particular instance of social interactions (i.e., how a person would react to another person's behavior, what a person is expected to do in a situation, etc.), cultural concepts (i.e., parents commonly hang art created by their young children in visible locations, four-leaf clovers are considered lucky, etc.), or other intuition-based ideas (i.e., an off-road vehicle is out of place next to scuba divers in an ocean, a worn path through a lawn is a commonly traveled path between two points without a connecting paved path, etc.). Additionally, the user can be instructed to select multiple instances of the intuition-based ideas or provide a series of indications related to the intuition-based ideas based on the question. Further, the user can be instructed to sort multiple objects, ideas, concepts, or other subject matters according to the intuition-based ideas identified in the challenge. Accordingly, specific instances of social interaction, cultural concepts, and other intuitive ideas can be associated with question formats that are available to the system and be manipulated by the user in response to the question. Question formats may include slots where synonyms can be interchanged, different levels of indirectness can be chosen (i.e., asking a user to identify a drawing done by a young child compared to asking a user to identify a drawing that would be on the desk of a parent compared to asking a user to identify a drawing that would be hung on a refrigerator), and other modifications to the structure of the question can be made. Such variations prevent the stagnation of the question pool and permit modular development of challenges in light of concepts targeted by the comprehension gate and qualities/features modified by the recognition gate. Accordingly, the question formats can be utilized or completed to generate the question for the intuition-based challenge.

At block 412, the system can transmit the question for presentation to the user. In some embodiments, the challenge, the question, and the set of media objects can be transmitted in a format that can be presented to the user in a manner described with respect to blocks 108 and 210.

Figure 5:
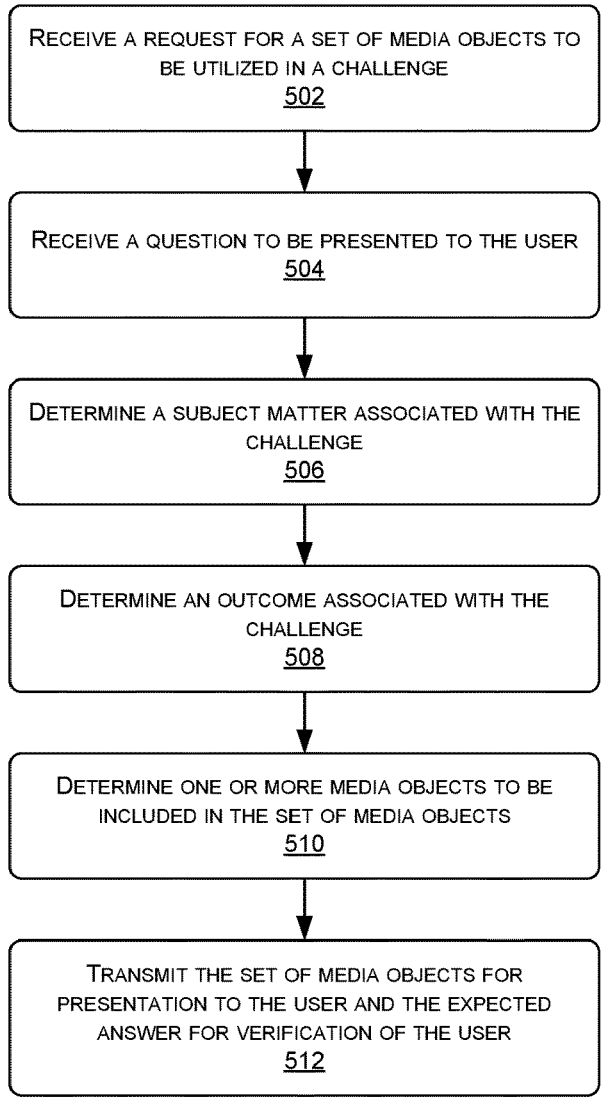
FIG. 5 illustrates an example method for determining a recognition gate based on a challenge type and an association comprehension gate utilizing a set of media objects for an intuition-based challenge.

FIG. 5 illustrates an example method for determining a recognition gate based on a challenge type and an association comprehension gate utilizing a set of media objects for an intuition-based challenge. In some embodiments, determining a recognition gate can be performed by a core engine of the system to compose one or more scenes to be presented to the user through one or more media objects. Additionally, the core engine can operate to automatically generate scenes based on modifiers and keywords that are associated with the subject matter of a challenge. Alternatively, the core engine can access a library of scenes that are indexed by keywords and subject matters available for modification and utilization to create the media objects utilized by the challenge.

At block 502, the system can receive a request for a set of media objects to be utilized in a challenge. In some embodiments, a set of media objects can be a single media object that includes multiple selectable objects, multiple variations of a single media object, or multiple media objects that are otherwise related by subject matter. As discussed with respect to FIGS. 1-4, a request can be received in response to a user requesting access to a resource, a client application attempting to re-verify that a user is a human, or other triggering event that causes the system to generate a challenge. Accordingly, upon receiving the request, the system can operate to generate a set of media objects for a challenge. Further, as discussed with respect to block 302 above, the system can also determine that a challenge is to be generated based on user actions that have been detected or be activated by a system administrator that establishes triggers for the challenge generation engine or embeds the challenge generation engine within an application.

At block 504, the system can receive a question to be presented to the user. In some embodiments, the question is associated with or otherwise indicates one or more qualities and/or features associated with individual media objects. Alternatively, the request can indicate desired qualities and/or features to be associated with individual media objects for the set of media objects without receiving the question. In at least one embodiment, the system can determine the qualities and/or features for the set of media objects from the challenge category and the subject matter determined according to FIG. 4. Accordingly, the system receives an indicator of the qualities and/or features that are associated with the one or more media objects of the set of media objects.

At block 506, the system can determine a subject matter for the set of media objects that is associated with the challenge. In some embodiments, this subject matter can be shared with the question determined with respect to FIG. 4. In some additional embodiments, the subject matter can be determined based on the qualities and features associated with the subject matter of the question. For example, the question may request a user identify a painting created by a young child. Accordingly, the subject matter of the question is child-like, simplistic, basic paintings. However, the qualities and features to be utilized for the set of media objects include the art medium, the method of creation, the sophistication of the artist, and other factors that can be used to present related, but ultimately distinct alterative media objects. Accordingly, the subject matter can be determined to encompass media objects that are related to the target of the question, but are ultimately distinguishable from the correct media object for the human user to select.

At block 508, the system can determine an outcome or a correct response for the challenge. In some embodiments, the outcome for the challenge is simply the media object that embodies the target of the question. For example, a painting that is done in watercolor and clearly done by a young child. In some additional embodiments, the outcome for the challenge can be a portion of a media object that is identified through consideration of the question. For example, where two crossing paths are displayed, one running from north to south and a second one running east to west, and the question requests the user to select the most commonly taken path between a point on the south side of the diagram and the east side of the diagram, the correct answer could be the path worn in the lawn that is a straight line between the southern point and the eastern point. Alternatively, where the diagram requests that the user identify the path people are supposed to take between the two points, the user could indicate a path that progresses north along the north/south path and turns right to progress east along the east/west path. Accordingly, a question can be associated with an outcome that is associated with the challenge.

At block 510, the system can determine one or more media objects to be included in the set of media objects. In some embodiments, the system can be associated with a media object library or database that stores a plurality of media objects that are formatted with associated subject matters, keywords, qualities, features, categories, and other delineating information that allows the system to distinguish between the various media objects. In particular, the media objects can be categorized so that upon determination of a question, the system is configured to access the media object library and determine potential media objects to be utilized in the associated challenge. Alternatively, the media objects can be selected based in part on the qualities and features identified by the system in response to the request for a challenge. Regardless of how the media objects are requested, the system can be configured to identify applicable media objects. Additionally, the system can identify media objects that represent potential correct answers and/or expected outcomes for the question. Upon identifying potential correct answers, the system can randomly select an appropriate media object or determine a specific media object based on the localization information obtained from the user. By utilizing the localization information in selecting the correct media object, a human user is provided a greater chance of intuitively identifying the correct media object from the set of media objects. For example, where the question instructs the user to identify a painting made by a young child, the correct media object would be a digital representation of such a painting that has been stored within the media object database. Similarly, related media files can be extracted from the media object database to provide alternative, incorrect answers to the question. For example, fine art, high end photography, and museum pieces may be presented to the user as incorrect media objects for the above example.

In some additional embodiments, an initial media object may be selected based on the question to be shown as a reference point for the user when the question is presented. For example, the question could request the user identify an object that does not belong on a beach vacation, wherein the question is associated with a picture of a family on the beach. Accordingly, the user is given a reference point for comparison with the media objects subsequently presented by the challenge. Additionally, and continuing the example, the subsequent media objects can include pictures of the same or other families on the beach with a vehicle, with a sandcastle, and other images that include appropriate additions to the first image. Further, a media object displaying an abnormal addition can be displayed to the user such as a dangerous animal, a person wearing a business suit, or other anomaly. It should be noted that the pictures can be modified by a core engine of the system to produce modified versions of the original picture that include the additional objects. Accordingly, the system can be configured to modify an original image or related images to produce the set of media objects that the user is to examine before selecting the correct media object. Finally, the media objects within the media object database can be selected based on the shared subject matters, qualities, features, keywords, etc. and then modified to further suit the challenge generated for the user.

In some further embodiments, the system can be configured to generate new media objects from a database of media object samples or components stored in the media object database. In particular, media object components can be associated with subject matters and variable labels that indicate appropriate background components, foreground components, interaction components, and other features that allow a new media object to be constructed from the samples provided by the media object database. Additionally, the system can be configured to generate representations of human reactions and emotions to simplify the interpretations made by a user when determining the appropriate selection for a challenge. For example, where the user is asked to find certain paths along a diagram, different components can be generated by the system to fit the question being presented to the user. Accordingly, the starting location, end location, potential paths, and established paths can be interchangeably combined to form new diagrams. Additionally, and similar to the above beach example, a scene can be generated from media object components (such as beach balls, sand volley ball courts, waves, sandcastles, and people participating in the activities) to display groups of objects, individuals, scenery, activities, and other subject matters in response to a request for a challenge. Accordingly, the core engine of the system can operate to form media objects comprised of related components and/or including abnormal components based at least in part the requirements of the challenge.

The core engine of the system can operate to select, modify, and/or create one or more media objects for inclusion in the set of media objects for the challenge. The set of media objects includes at least a media object that displays the expected outcome (i.e., a feature that the user is expected to identify) for the challenge that a human user is expected to intuitively recognize based at least in part on the question. In some embodiments, a single media object is presented to the user, causing the user to select a portion of the media object to indicate a user response. In some additional embodiments, a plurality of media objects can be presented to the user wherein one of the media objects is the expected outcome for the challenge.

At block 512, the system can transmit the set of media objects for presentation to the user and the expected answer to a verification engine to determine whether the user is a human based on the user response to the challenge. In some embodiments, the set of media objects can be transmitted to the user as a part of the challenge as described by FIGS. 1-4.

Figure 6:
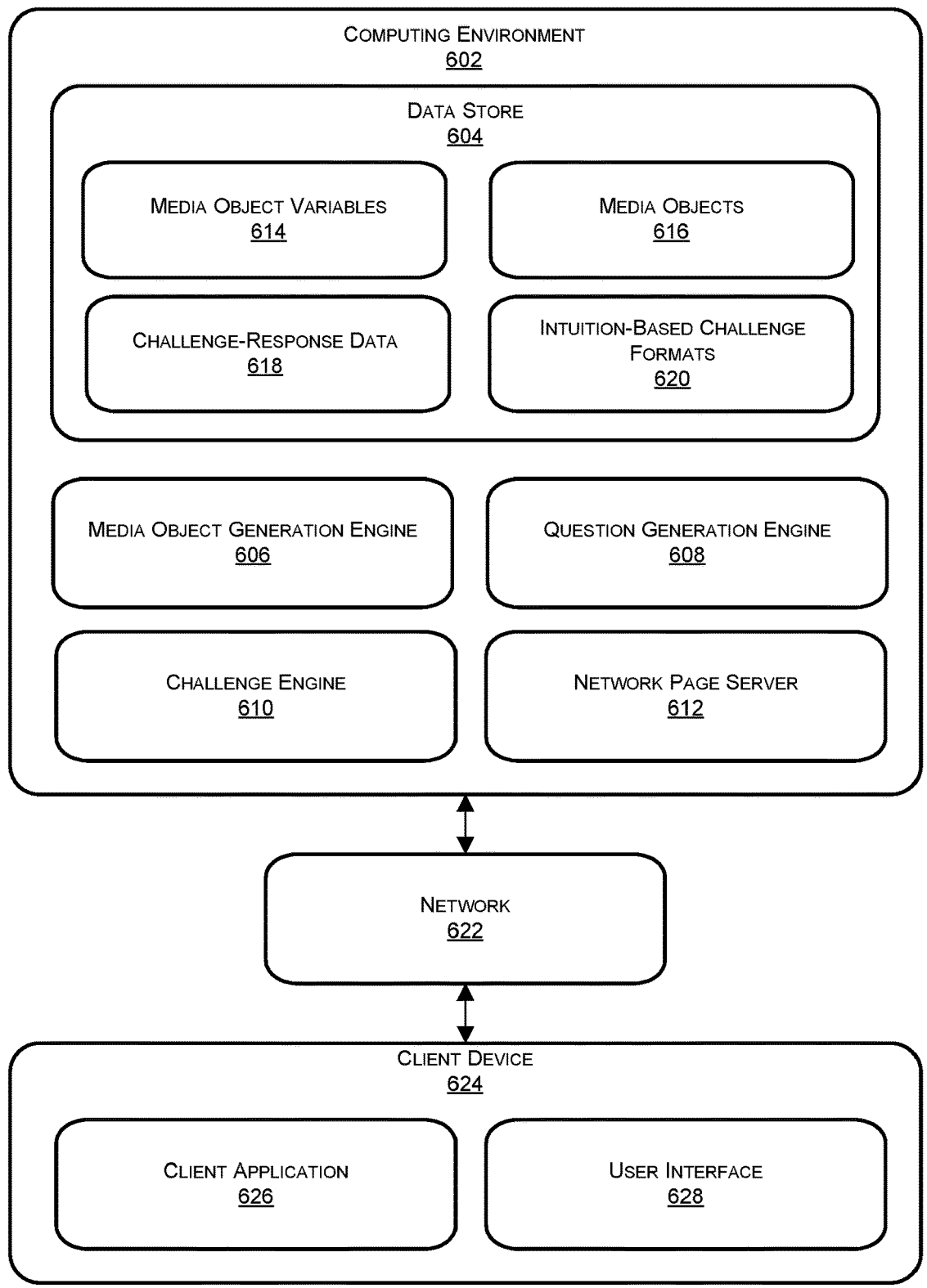
FIG. 6 illustrates a schematic block diagram of a networked environment configured to implement the challenge-response tests that trigger intuition-based decision making by a user.

FIG. 6 illustrates a schematic block diagram of a networked environment configured to implement the challenge-response tests that trigger intuition-based decision making by a user. In some embodiments, computing environment 602, can include a data store 604, a media object generation engine 606, a question generation engine 608, a challenge engine 610, and a network page server 612. The data store 604 can be a database that stores media object variables 614, media objects 616, challenge-response data 618, and/or intuition-based challenge formats 620. Additionally, the computing environment can be connected, via network 622, with a client device 624 that operates client application 626 and interacts with a user through user interface 628.

The computing environment 602 can comprise, for example, a server computer or any other system providing computing capability. Alternatively, the computing environment 602 can employ a plurality of computer devices that can be arranged in one or more computer banks, server banks, remote installations, or other arrangements of computing capabilities. Additionally, the computing capabilities utilized by computing environment 602 can be location in a single location or distributed among different locations. Further, the computing environment 602 can include a plurality of computing devices that together can comprise a hosted computing resource, a grid computing resource, and/or any other distributed computing arrangement. In at least one embodiment, computing environment 602 can correspond to an elastic computing resource where the allotted capacity of processing, network, storage, and/or other computing-related resources may vary over time.

Data store 604 can be representative of a plurality of data stores 604. The data stored in the data store 604 can be associated with the operation of the various applications and/or functional entities described below. In some embodiments, the data store can include information specific to the functions of the various functional entities implemented by computing environment 602. In particular, the media object variables 614 and the media objects 616 can be utilized by the media object generation engine 606 in a manner described with respect to FIGS. 3, 4, and 5. Similarly, the challenge-response data 618, and intuition-based challenge formats 620 can be utilized by the question generation engine 608 in a manner described with respect to FIGS. 3 and 4. In at least one embodiment, the media object variables 614 can be utilized by the media object generation engine 606 to automatically generate media objects that can be used as initial scenes or potential answers for a challenge. In at least one additional embodiment, the media object variables 614 and the media objects 616 can be utilized by the media object generation engine 606 to modify one or more media objects for a challenge. In at least one further embodiment, the challenge-response data 618 can include information that describes the relationships between objects and intuitive conclusions that a human user would reach based on a presented question. Additionally, the intuition-based challenge formats 620 include question formats that can be configured by the question generation engine 608, based on the challenge-response data 618, to create a question for individual requested challenges. Further, the challenge-response data 618 can include user information and/or user profile information provided to the computing environment 602.

The media object generation engine 606 is executed to render images that can be used for challenges. The media object generation engine 606 can render images or videos that are based on 2D or 3D scene in which objects or depicted individuals can be placed and configured based on the challenge that can be presented to a user. The media object generation engine 606 can further animate the scene provided as a part of the challenge to better describe a scenario or generate audio information for presentation to the user. Additionally, the media object generation engine 606 can access background scenes (i.e., forest, ocean, beach, volcano, field, city, etc.) or features from the background scenes (i.e., trees, coral outcroppings, beach tents, buildings, animals, fish, etc.) and utilize the background scenes and background features to generate new media objects. Further, the media object generation engine can further install additional elements from the media object variables 614 and media objects 616 to complete the generated media object.

The challenge engine 610 can generate challenges that can be used to determine whether to grant or deny access to a resource. The challenges can be used by a website, remote resource providers, or other resource sources where an administrator has decided to limit access to authenticated users or to user that are actual humans rather than programs or algorithms. For example, an administrator of a ticketing or banking website may wish to verify that access to the site is granted to user devices that are operated by humans rather than artificial intelligences or machine learning algorithms. The challenge engine 610 can also verify whether a particular challenge provided to a user via a user interface is correctly or incorrectly solved by the user.

The challenge engine 610 can further generate challenges by interacting with an application programming interface (API) provided by the media object generation engine 606 and question generation engine 608. In some embodiments, the challenge engine 610 can utilize the provided APIs to direct the object generation engine 606 and the question generation engine 608 to provide the requisite components to construct a challenge to be provided to a user. Additionally, the challenge engine 610 can define the order of presentation of media objects, how media objects should be modified by the media object generation engine 606, what question format is to be utilized by the challenge, and so on.

The challenge engine 610 can operate to refine the media objects variables 614 and the media objects 616 stored by data store 604. In particular, the challenge engine can receive indications of user answers compared to expected answers for a challenge, help services where users were falsely identified as non-human users and restricted from access to resources, and other indicators of the effectiveness of a challenge distinguishing human users from non-human users. Additionally, the challenge engine 610 can operate to modify the media object variables 614 and the media objects 616 to remove challenge subject matters and formats that consistently misidentify human users and non-human users. Further, the challenge engine 610 can operate to generate additional challenge subject matters, formats, and questions related to challenges that have consistently distinguished between human and non-human users. Accordingly, data sets of user responses and the successful/unsuccessful categorization of a user as human or non-human can be collected and utilized to further refine the challenge engine 610 to decrease the number of false positive and false negative categorizations of users. The can extend to distinguishing between the density, number, size, modification types, and other qualities of media object features utilized in challenges that distinguished or failed to distinguish between human and non-human users. In at least one embodiment, the data sets collected by the challenge engine 610 can be utilized to train machine learning algorithms to identify new types or iterations of challenges, media object variables 614, and/or media objects 616 that can be utilized by the challenge engine 610. Alternatively, the machine learning algorithm can be trained to identify challenges, media object variables 614, and/or media objects 616 that should be removed from the pool of potential challenges.

Further, the challenge engine 610 can be a challenge-response test that operates to provide a deeper verification of user identity and authorization to access digital resources. In some embodiments, detailed user information can be provided either via the client application 626 or via a client information database. Additionally, the detailed user information can be utilized to general challenge-response tests that are specific to a position, a role, and/or an individual within an organization. For example, a company can determine that a research group should have its information secured against access from individuals outside a team of researchers assigned to the research group. Accordingly, information regarding the individuals of the research group can be provided by the company to generate challenges that are specific to the researchers assigned to the research group. Challenges generated from this information can be relatively mundane for the researches that work in the environment described by the data, but external users would find it virtually impossible to select the correct answer to the challenge.

The network page server 612 can be executed to provide content to the client device 624 or to a user device. The content can include the user interface 628, media objects that comprise the challenge, the question that is included by the challenge, and other aspects of the challenges provided to users. The network page server 612 can also determine whether to grant or deny access to a resource based upon whether a challenge embedded within a user interface 628 and presented to via the client (or user) device 624 is correctly solved by a user. For example, in order to access the resource, the network page server 612 may prompt a user to authenticate and solve a challenge generated by challenge engine 610.

The network 622 can be the Internet, intranets, extranets, wide area networks (WANs), local area networks (LANs), wired networks, wireless networks, or other suitable networks that allow for the computing environment 602 to exchange information with the client device 624 and the user via the user interface 628.

The client device 624 can be representative of a plurality of client devices 624 that can connect to the network 622 and communicate with the computing environment 602. The client device 624 can include a processor-based system such as a computer system. Computer systems can be embodied in the form of a desktop computer, a laptop computer, personal digital assistants, cellular telephones, smartphones, set-top boxes, music players, web pads, tablet computer systems, game consoles, electronic book readers, or other devices with similar capabilities. The client device can include a user interface 628. The user interface 628 can be implemented via one or more devices such as liquid crystal display (LCD) displays, gas plasma-based flat panel displays, organic light emitting diode (OLED) displays, electrophoretic ink (E ink) displays, LCD projectors, speakers, microphones, headphone, or other types of user interface devices.

The client device 624 can also execute a client application 626 that can render the user interface 628 on the displays described above. For example, the client application 626 can be executed on the client device 624 to access network content served up by the computing environment 602 and render/embed the challenge within the user interface 628 generated by the challenge engine 610. The client application 626 can be implemented as a browser-based application or a special-purpose application. Additionally, the user interface 628 can display a network page, an application screen, or other graphical user interface formatted to present the challenge to the user. The client device 624 can also execute additional applications beyond the client application 626. In certain embodiments, the client device 624 may include one or more input components, which may include one or more displays in which the user interface(s) 628 are presented, a keyboard or keypad, a mouse, one or more microphones, and so on. The input components may receive information from the user in a visual or audible manner. A touch-sensitive display may serve as an input component since the user may input a request or a response via the display. The client device may also include one or more output components, which may also include the display(s) and/or one or more speakers that output audio data. As stated above, the display(s) and the associated user interface(S) 128 may visually output the challenges.

In some additional embodiments, the computing environment 602 can be provided to a client for utilization with the client device 624 and/or the client application 626. In particular, the data store 604, the media object generation engine 606, the question generation engine 608, and the challenge engine 610 can be provided to the client. Additionally, the data store can store the media object variables 614, the media objects 616, the challenge-response data 618, and/or the intuition-based challenge formats 620. Alternatively, the client can provide the media object variables 614 and the media objects 616 such that the computing environment 602 receives a media object library from the client or a third-party. The media object library provided by the client or the third-party can include media objects and media object variables that can be utilized by the computing environment 602 to generate challenges without the need for the network page server, in an offline or internal network environment, and/or based on client information provided to the computing environment 602. For example, a pharmaceutical company can provide a media object library that includes various proteins, pharmaceuticals, biologics, therapeutics, or other profession specific information that can be utilized to generate challenges. Additionally, the data store 604 can receive the media object variables 614 and the media objects 616 from the provided media object library and incorporate the information with the challenge-response data 618 and the intuition-based challenge formats 620. Accordingly, organizations can utilize internal data with the described computing environment to generate custom, organization specific challenges that secure organization resources from unauthorized access.

Accordingly, computing environment 602 can provide enhanced security measures for client resources and data from unauthorized access by an entity. To prevent client data from being obtained in an unauthorized manner and utilized to harm the client or other users, the computing environment can provide remote verification of users before they are granted access or continued access to the digital resources of the client device 624 and/or client application 626. By providing the computing environment 602 that generates human intuition-based challenges, users of the client device 624 and client application 626 can be verified as human and potentially authenticated based on the user information provided to the computing environment 602.

Figure 7:
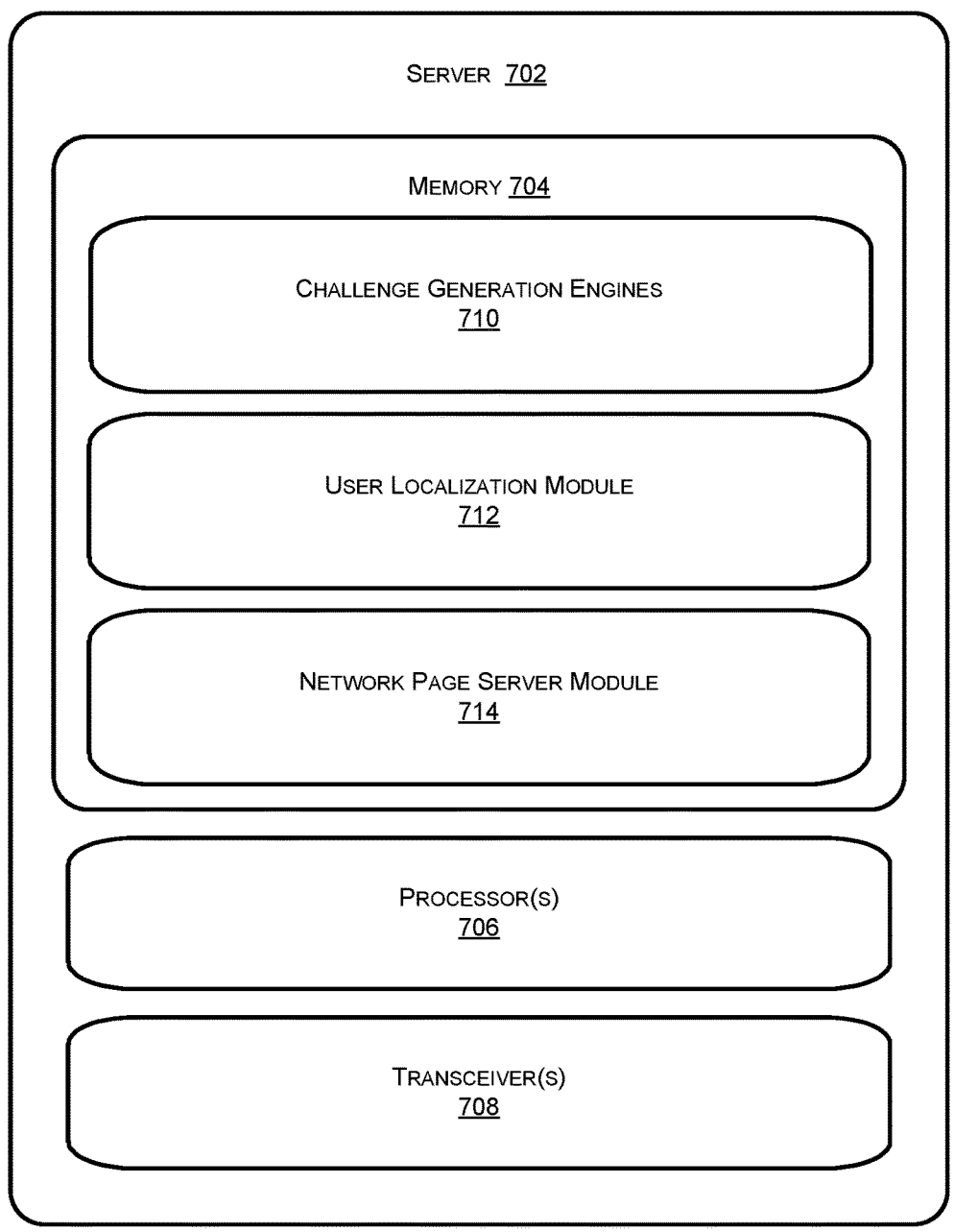
FIG. 7 illustrates a block diagram of a server that hosts a computing environment to generate a challenge comprising a question and a set of media objects to determine whether a user is human.

FIG. 7 illustrates a block diagram of a system that can be utilized to generate challenges comprising a question that prompts a user to analyze one or more media objects and provide an indication of a response to the challenge. In some embodiments, system 702 can interact with or correspond to any of the systems and/or implement the methods discussed in FIGS. 1-6. As illustrated, system 702 is generally comprised of memory 704, one or more processors 706, and one or more transceivers 708.

In some embodiments, memory 704 can be volatile (such as RAM), non-volatile (such as ROM, flash memory, etc.) or some combination of the two. The memory 704 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that the system 702 accesses during execution of the above methods and/or operation of the above systems. The memory 704 can comprise one or more modules that cause the processors to execute one or more instructions and perform the operations discussed above with response to FIGS. 1-6. Further, the memory 704 can comprise additional modules that can be executed by the processors 706 and cause the processors 706 to perform additional operations associated with the system 702. The additional modules can comprise challenge generating engines 710, a user localization module 712, and a network page server module 714.

In some embodiments, the processors 706 can include one or more central processing units (CPUs), one or more graphics processing units (GPUs), both CPUs and GPUs, or other processing units or components known in the art.

In some embodiments, the transceivers 708 can include one or more wired or wireless transceivers. For instance, the transceivers 708 can include a network interface card, a network adapter, a LAN adapter, an address associated with a network connection, or another device permitting communications to be sent and received. Additionally, the transceivers 708 can comprise any wireless transceiver capable of engaging in wireless, radio frequency (RF) communication. Further, the transceivers 708 can also include other wireless modems, such as Wi-Fi, WiMAX, Bluetooth, and/or infrared communication modems. Accordingly, the one or more transceivers 708 can be configured to transmit challenge formatting information, transmit content associated with challenges, and receive information and indications provided by users and client devices.

In some embodiments, and as noted above, the memory 704 includes challenge generation engines 710. In particular, the challenge generation engines 710 operate to generate comprehension gate questions, generate recognition gate media objects, and determine the how the questions and media objects interrelate within a challenge. Additionally, the challenge generation engines can operate to create media objects from concepts utilized to generate comprehension gate questions, modify media objects in light of qualities and features that are to be determined for a challenge, and generate a user interface for presenting the challenge and receive a user response.

In some embodiments, memory 704 includes user localization module that operates to obtain user information and filter potential question concepts, media object qualities and features, and what modifications to the media objects would allow a human user to distinguish between correct responses and incorrect responses. In particular, the user localization module identifies pertinent traits of the user such as a culture, country, religion, occupation, or other association that defines what concepts are intuitive to that user. By identifying a localization for the user, it is possible to prevent a user in Europe from receiving a foreign concept that is indistinguishable from incorrect answers due to the foreign concept relating to American culture. Further, localization of a user permits more targeted intuitive challenges that can include nuanced distinctions that are non-obvious to individuals outside of that localization.

In some embodiments, memory 704 includes a network page server module 714 that handles communications between services utilizing the intuition-based challenges and the generation modules. In particular, once an administrator for a resource determines to utilize the intuition-based challenges to secure the resource, a user interface can be embedded within the resource access portal. Additionally, user attempts to access the resource can be redirected to the network page server module 714 until the user is successfully verified as a human user or the network page server module returns an indication that the user is not a human user.

What is claimed is:

1. A system comprising:
   one or more processors;
   a memory storing one or more instructions that are executable by the one or more processors to perform operations comprising:
   receiving an indication that a user is requesting, via a user interface presented on a display of a user device of the user, access to a digital resource;
   determining, based on the indication, a set of images comprising a first scene that depicts an interaction between a first individual and a second individual, a second scene that depicts a first outcome associated with the interaction, and one or more additional scenes that depict one or more second outcomes associated with the interaction, the set of images being determined based on a first likelihood of identification by a human user of the first outcome being greater than a second likelihood of identification by the human user of the one or more second outcomes;
   determining, based on the set of images, a question that prompts the user to identify the first outcome;
   generating, based on the set of images and the question, a challenge-response test configured to verify that the user is the human user;
   presenting the challenge-response test to the user via the user interface;
   receiving, via the user interface, a user response that includes a selected scene from the second scene and the one or more additional scenes;
   determining that the selected scene matches the second scene; and
   granting access to the digital resource based on the selected scene matching the second scene.

2. The system as recited in claim 1, wherein the operations further comprise:
   presenting the challenge-response test to a second user via a second user interface on a second display of a second user device;
   receiving, via the second user interface, a second user response that includes a second selected scene from the second scene and the one or more additional scenes; and
   denying access to the digital resource based on the second selected scene matching an additional scene of the one or more additional scenes.

3. The system as recited in claim 2, wherein the operations further comprise:
   generating, based on the second selected scene matching the one or more additional scenes, a second challenge-response test comprised of a second set of images and a second question, the second set of images including a third scene associated with the first outcome;
   presenting, via the second display, the second challenge-response test to the second user;
   determining, based on a third user response, that the second user selected the third scene; and
   granting access to the digital resource based on the second user selecting the third scene.

4. The system as recited in claim 1, wherein the operations further comprise determining, based on the selected scene matching the second scene, that the user requesting access to the digital resource is human.

5. The system as recited in claim 1, wherein:
   the set of images are selected from a media object database comprised of a plurality of media objects depicting interactions between the first individual and the second individual, wherein each of the interactions are associated with an interaction outcome;
   the first scene is generated from a media object depicting the interaction between the first individual and the second individual;
   the second scene is generated from the first outcome; and
   the one or more additional scenes are generated from the one or more second outcomes.

6. A method comprising:
   receiving an indication that a user is requesting, via a user interface presented on a display of a user device of the user, access to a digital resource;
   determining, based at least in part on user information associated with a user profile of the user, a challenge type of a challenge, and a question category of a question of the challenge;
   determining that the challenge is to be presented to the user via the user interface, to verify that the user is human;
   determining, based at least in part on the indication, the question that causes the user to identify a first feature from context associated with the challenge;

determining a set of media objects that includes a media object associated with the first feature and one or more media objects associated with one or more second features that are different from the first feature, the set of media objects being determined based at least in part on a first likelihood of the media object being selected by a human user being greater than a second likelihood of the one or more media objects being selected by the human user;

generating the challenge comprising the question and the set of media objects;

presenting, via the user interface and on the display of the user device, the challenge to the user;

determining, based at least in part on a user response to the challenge, whether the user is the human user; and granting access to the digital resource based at least in part on the user response and a determination that the user is the human user.

7. The method of claim 6, wherein the first feature is at least one of:

identifying a creator, a feature, or a style associated with a work of art;

determining a course of action within a scenario that is associated with a culture of the user;

determining cause and effect relationships between media objects;

identifying a scene that includes one or more features that are unassociated with the scene; or identifying an expected response of an individual to an additional scenario.

8. The method of claim 6, further comprising:

retrieving, based at least in part on a request for the challenge, the user information associated with the user; and generating the challenge based at least in part on the user information.

9. The method of claim 8, wherein generating the challenge based at least in part on the user information comprises:

determining a user association between the user and at least one of a location, a country, an occupation, a culture, a religion, or an organization; and determining the first feature to be identified by the user based at least in part on the user association.

10. The method of claim 8, wherein generating the challenge based at least in part on the user information comprises:

determining a user association between the user and at least one of a location, a country, an occupation, a culture, a religion, or an organization; and generating the set of media objects from scenes commonly associated with the user association.

11. The method of claim 8, wherein generating the challenge based at least in part on the user information comprises:

determining a user association between the user and a subject selected from at least one of a location, a country, an occupation, a culture, a religion, or an organization; and determining, based at least in part on the user association, that the first feature is a foreign feature within the media object, wherein the media object depicts a scene or a scenario associated with the subject.

12. The method of claim 6, further comprising at least one of:

granting the user access to a requested resource based at least in part on determining that the user is human; or permitting the user to continue use of an accessed resource based at least in part on determining that the user is human.

13. The method of claim 6, further comprising:

determining, based at least on the user response, that the user is an artificial user; and preventing the user from accessing a resource associated with a request or revoking access to the resource by the user based at least in part on the user being the artificial user.

14. A system comprising:

one or more processors; and a memory storing one or more instructions that are executable by the one or more processors to perform operations comprising:

determining one or more media object features that a user is to identify within one or more media objects;

determining, based at least in part on the one or more media object features, a question terminology that causes human users to identify the one or more media object features;

determining user information associated with the user;

selecting, based at least in part on the user information, one or more modifications to modify one or more initial features of a media object of the one or more media objects to generate the one or more media object features, the one or more modifications being selected based at least in part on a first likelihood of the media object being selected by a human user being greater than a second likelihood of remaining media objects of the one or more media objects being selected by the human users;

generating, based at least on the question terminology, a challenge that instructs the user to identify the one or more media object features and that presents the one or more media objects; and determining, based at least in part on a user response from the user with respect to the challenge, whether the user is the human user; and granting access to a digital resource based at least in part on the user being the human user.

15. The system as recited in claim 14, wherein the media object is at least one of an image, an audio clip, or a text-based description of a scene.

16. The system as recited in claim 14, wherein determining the one or more media objects comprises:

receiving, at a media object generation engine, the question terminology, wherein the question terminology is associated with a keyword that identifies a plurality of media objects within a media object database; and generating, based at least in part on the plurality of media objects, the media object, the media object being associated with the question terminology and the one or more media object features.

17. The system as recited in claim 14, wherein determining the one or more media objects comprises:

identifying one or more media object variables associated with question terminology;

requesting, from a media object database, one or more associated media objects that include the one or more media object variables; and selecting the media object from the one or more associated media objects.

18. The system as recited in claim 14, wherein selecting the one or more modifications further comprises:

modifying the media object to include a first modification of the one or more modifications, the first modification associated with the one or more media object features; and modifying the media object to include one or more second modifications of the one or more modifications, the one or more second modifications different from the first modification.

19. The system as recited in claim 14, wherein determining whether the user is the human user further comprises determining that the user response indicates that the user selected the media object from the one or more media objects.

20. The system as recited in claim 14, wherein the operations further comprise transmitting an indication that the user is the human user to a digital resource that requested verification that the user is permitted to access the digital resource.

\* \* \* \* \*